United States Patent [19]
Komatsu

[11] Patent Number: 6,144,860
[45] Date of Patent: Nov. 7, 2000

[54] SYSTEM AND METHOD FOR CONTROLLING TRANSMISSION POWER

[75] Inventor: Masahiro Komatsu, Tokyo, Japan

[73] Assignee: NEC Corporation, Tokyo, Japan

[21] Appl. No.: 08/958,492

[22] Filed: Oct. 27, 1997

[30] Foreign Application Priority Data

Oct. 28, 1996 [JP] Japan ........................ 8-285148

[51] Int. Cl.⁷ .................................................. H04Q 7/20
[52] U.S. Cl. ........................................ 455/522; 455/69
[58] Field of Search ........................ 455/572, 69, 423, 455/522, 70; 370/342

[56] References Cited

U.S. PATENT DOCUMENTS

| | | | |
|---|---|---|---|
| 5,386,589 | 1/1995 | Kanai .......................... | 455/423 |
| 5,574,983 | 11/1996 | Douzono et al. .............. | 455/69 |
| 5,579,304 | 11/1996 | Sugimoto et al. ............. | 370/342 |
| 5,604,766 | 2/1997 | Dohi et al. .................. | 375/200 |
| 5,638,362 | 6/1997 | Dohi et al. .................. | 370/342 |
| 5,873,028 | 2/1999 | Nakano et al. ................ | 455/69 |
| 5,886,987 | 3/1999 | Yoshida et al. ............... | 370/318 |
| 5,903,554 | 5/1999 | Saints ........................ | 455/67.3 |

FOREIGN PATENT DOCUMENTS

2-256331  10/1990  Japan.
5-244056   9/1993  Japan.

*Primary Examiner*—Daniel S. Hunter
*Assistant Examiner*—Myron K. Wyche
*Attorney, Agent, or Firm*—Ostrolenk, Faber, Gerb & Soffen, LLP

[57] ABSTRACT

A transmission power control system suitable in use for a mobile communications system in which communications are performed through a many-valued encoding operation in which codes are represented with symbols. CIR calculating means is disposed in the transmission station and calculates a CIR by subtracting an interference signal level from a desired signal level of a transmission signal, wherein the desired signal level is obtained based on an average power of inverse-modulated pilot symbols each obtained by inverse-modulating a pilot symbol with a theoretical value of the pilot symbol, and wherein the interference signal level is obtained based on a distribution of inverse-modulated pilot symbols each obtained by inverse-modulating a pilot symbol with a theoretical value of the pilot symbol. Transmission power indicating means is disposed in the transmission station and transmits an indication for transmission power control according to the CIR of the transmission signal from the remote call station. Transmission power adjusting means is disposed in the remote call station and varies transmission power according to the indication for transmission power control from the transmission station. The quality of a receive signal can be maintained by improving the measurement accuracy of a received signal level.

6 Claims, 6 Drawing Sheets

SYSTEM AND METHOD FOR CONTROLLING TRANSMISSION POWER

BACKGROUND OF THE INVENTION

The present invention relates to a system and method for controlling transmission power in a cellular mobile communications system for bidirectional communications.

In digital automobile telephone radio communications, bidirectional communications is carried out by setting radio channels between a base station and a mobile station, each having a transmitter and a receiver. In such communications, the transmission power must be suitably controlled to maintain the signal quality at a constant level.

JP-A-256331/1990 and JP-A-244056/1993 disclose the conventional prior art transmission control technique mentioned above.

In the configuration disclosed in JP-A-256331/1990, a base station includes level measuring means for measuring the receive level of a control signal transmitted from a mobile station and transmission means for transmitting level data judged by said level measuring means. A mobile station includes means for controlling the transmission level according to level data transmitted from the base station.

JP-A-244056/1993 discloses the configuration of controlling the transmission power according to an average receive bit error rate and a CIR (a carrier power to interference power ratio).

Figure 5:
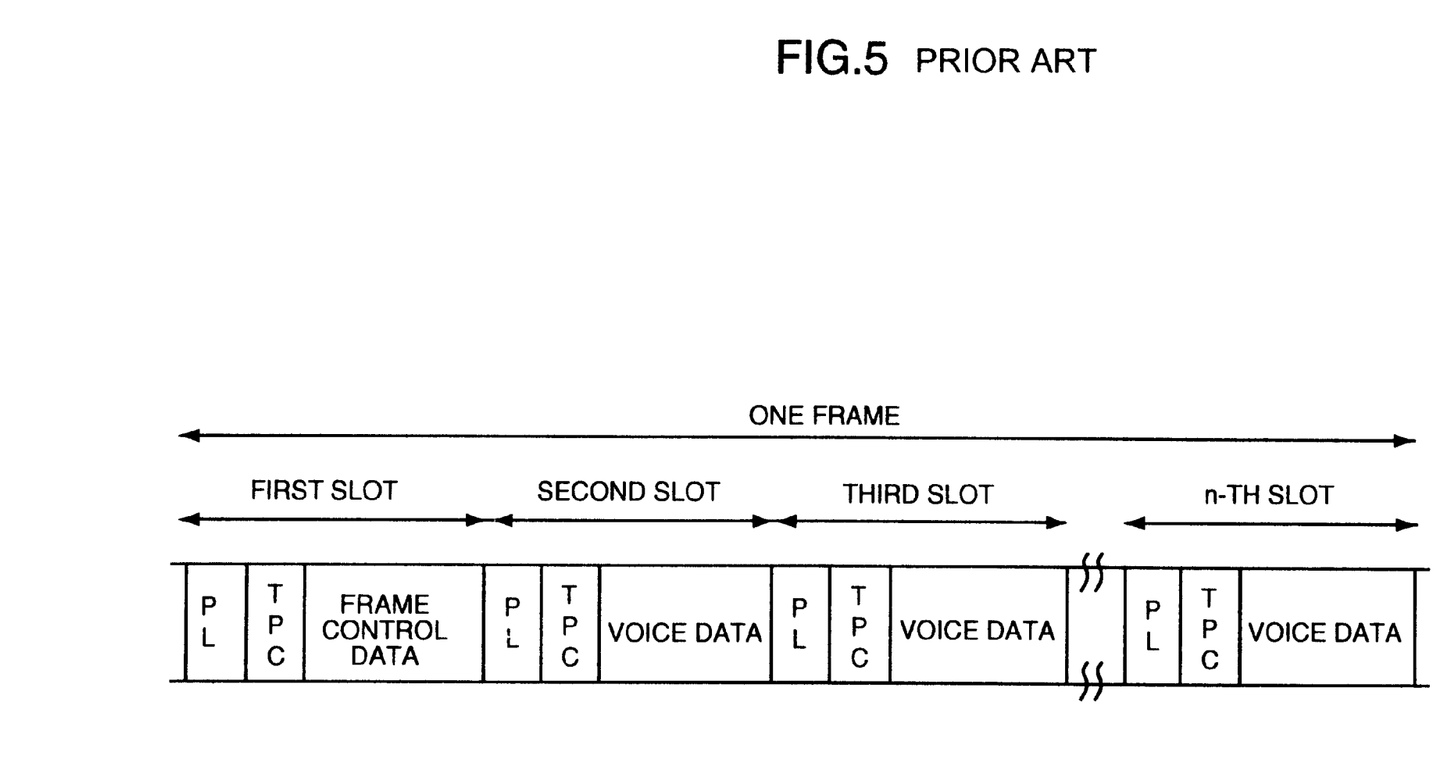
FIG. 5 is a diagram showing the configuration of a frame format used in the present invention.
Figure 6A:
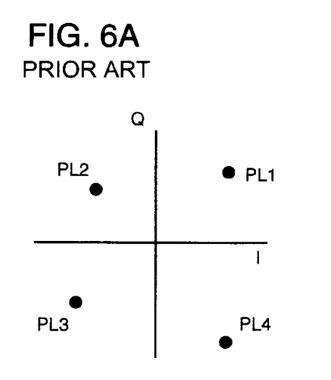
FIG. 6A is a diagram showing four symbols on an IQ plane.
Figure 6B:
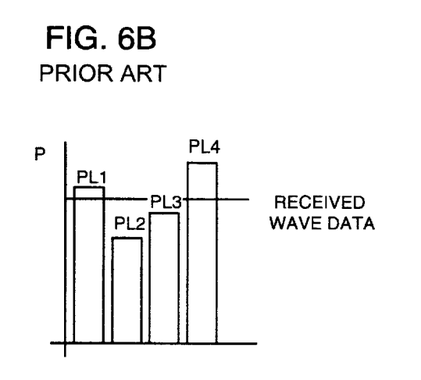
FIG. 6B is a diagram showing received signal levels of a conventional power transmission control system.
Figure 7:
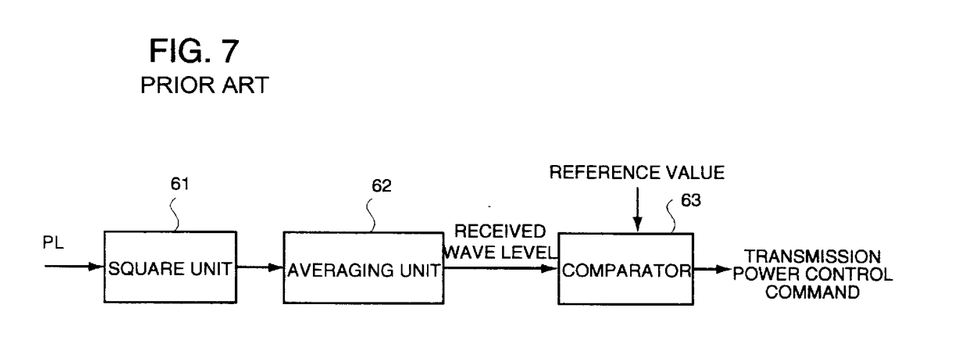
FIG. 7 is a block diagram showing the configuration of a conventional power transmission control system.

FIGS. 5 to 7 are explanatory diagrams each showing a prior art of obtaining a received signal level needed to control transmission power.

FIG. 5 is a diagram showing voice data encoded and transmitted for each frame and formed of plural slots. Each of slots forming each frame except the first slot is formed of a pilot (PL), a TPC (transmission Power Control) bit, and voice data. The first slot, or the leading portion of a frame, includes frame control data, instead of voice data.

The pilot in the first slot is formed of four symbols PL1, PL2, PL3, and PL4. Communication is performed under QPSK (Quadrature phase Shift Keying) modulation.

FIG. 6A and 6B are diagrams showing a diagram in which symbols PL1, PL2, PL3, and PL4 received are represented on an IQ plane. FIG. 6B is a diagram showing received signal levels obtained by calculating (squaring) the power of each symbol based on the received pilot symbols, and then calculating the average value of them. FIG. 7 is a diagram showing the configuration of a device, installed at a base station or mobile station, of creating a transmission power control command from a received pilot symbols.

As shown in FIG. 7, the prior art transmission power control device consists of a square unit 61, an averaging unit 62, and a comparator 63. The square unit 61 calculates the power of each symbol based on received pilot symbols. The average unit 62 averages the levels of power calculated by the square unit 61 to obtain a received signal level. The comparator 63 compares the received signal level with a reference value and then creates a transmission power control command which controls transmission power according to the comparison result.

In a base station and mobile stations, each having the above-mentioned configuration, the received signal level is periodically measured during a calling operation. The base station (or mobile station) compares the received signal level with a reference value. If the received signal level is more than the reference value, the base station (or mobile station) transmits a transmission power reducing command to a mobile station (or base station). When the mobile station (or base station) receives the command, it immediately decreases its transmission power by a predetermined control step width. When the received signal level is less than the reference value, the base station (or mobile station) transmits a transmission power increasing command to a mobile station (or base station). When the mobile station (or base station) receives the command, it immediately increases its transmission power by a predetermined control step width. Under such control, the received signal level can be maintained nearly to the reference value.

Now, let us explain how to obtain a CIR used for control. Conventionally, in order to obtain a CIR communications under PSK modulation, the power (full received power) of a signal converted into a base band signal is measured. Then the ratio of a desired signal level to an interference signal level is obtained. The desired signal level corresponds to the power of a signal after detection. The interference signal level corresponds to a level obtained by subtracting the desired signal level from the full received power.

In a power calculation, baseband signals are digitally sampled in symbol cycles. Then, the average value of the sampled signals regarded as a full received power. Similarly, a desired signal level is an average value of square values of signals after detection.

In the conventional transmission power control method in which a received signal level measured is compared with a reference value, there is the disadvantage in that when an actually-received signal level is measured with poor precision, it deviates from a target value, whereby transmission power varies extremely.

Moreover, there is the disadvantage in that fading particularly degrades the precision in level measurement because of large influence of noises, except desired waves.

When the transmission power is controlled using a CIR, interference causes a large error in the full received power and desired signal level obtained through the above-mentioned calculation, thus occurring troubles in transmission power control.

SUMMARY OF THE INVENTION

The objective of the present invention is to solve the above-mentioned tasks.

Moreover, the objective of the invention is to provide a transmission power control system that can maintain the quality of a receive signal by improving the measurement accuracy of a received signal level.

Furthermore, the objective of the present invention is to provide a transmission power control method that can maintain the quality of a receive signal by improving the measurement accuracy of a received signal level.

The objective of the present invention is achieved by a transmission power control system suitable in use for a mobile communications system, in which communications between a base station and a mobile station are performed through a many-valued encoding operation in which codes are represented with symbols. The base station act either as a transmission station or a remote call station. Similarly the mobile station acts as a remote call station or a transmission station. The base station has a transmitter and a receiver and the mobile station has a transmitter and a receiver. The preset intentional includes CIR calculating means disposed in the transmission station, for calculating a CIR by subtracting an interference signal level from a desired signal level of a transmission signal, wherein the desired signal level is obtained based on an average power of inverse-modulated pilot symbols each obtained by inverse-modulating a pilot symbol with a theoretical value of the pilot symbol. The interference signal level is obtained based on a distribution of inverse-modulated pilot symbols each obtained by inverse-modulating a pilot symbol with a theoretical value of the pilot symbol. Transmission power indicating means is disposed in the transmission station, for transmitting an indication for transmission power control according to the CIR of the transmission signal from the remote call station. Transmission power adjusting means is disposed in the remote call station, for varying transmission power according to the indication for transmission power control from the transmission station.

According to another aspect of the present invention, a CIR calculating means is disposed in the transmission station, for calculating a CIR by subtracting an interference signal level from a desired signal level of a transmission signal. The desired signal level is obtained based on an average power of inverse-modulated data each obtained by inverse-modulating known data among received data with a theoretical value and by inverse-modulating unknown data with a decision value judged after demodulation. The interference signal level is obtained based on a distribution of inverse-modulated data each obtained by inverse-modulating known data among the received data with a theoretical value and by inverse-modulating unknown data with a decision value judged after demodulation. Transmission power indicating means is disposed in the transmission station, for transmitting an indication for transmission power control according to the CIR of the transmission signal from the remote call station. Transmission power adjusting means is disposed in the remote call station, for varying transmission power according to the indication for transmission power control from the transmission station.

According to another aspect of the present invention, a CIR calculating means is disposed in the transmission station, for calculating a CIR by subtracting an interference signal level from a desired signal level of a transmission signal. The desired signal level is obtained based on an average power of inverse-modulated pilot symbols each obtained by weighting a pilot symbol with a fading estimated value and then inverse-modulating the weighted pilot symbol with a theoretical value. The interference signal level is obtained by weighting pilot symbols with a fading estimated value, then square averaging the weighted pilot symbols, and then subtracting the squared result from the desired signal level. Transmission power indicating means is disposed in the transmission station, for transmitting an indication for transmission power control according to the CIR of the transmission signal from the remote call station. Transmission power adjusting means is disposed in the remote call station, for varying transmission power according to the indication for transmission power control from the transmission station.

According to further another aspect of the present invention, a method for controlling transmission power of a mobile communications system, in which communications between a base station and a mobile station are performed through a many-valued encoding operation in which codes are represented with symbols, the base station acting as a transmission station or a remote call station, the mobile station acting as a remote call station or a transmission station, the base station having a transmitter and a receiver and the mobile station having a transmitter and a receiver, comprises the steps of calculating a CIR by subtracting an interference signal level from a desired signal level of a transmission signal, wherein the desired signal level is obtained based on an average power of inverse-modulated pilot symbols each obtained by inverse-modulating a pilot symbol with a theoretical value of the pilot symbol, and wherein the interference signal level is obtained based on a distribution of inverse-modulated pilot symbols each obtained by inverse-modulating a pilot symbol with a theoretical value of the pilot symbol, transmitting an indication for transmission power control according to the CIR of the transmission signal from the remote call station, and varying transmission power according to the indication for transmission power control from the transmission station.

According to further another aspect of the present invention, the method includes the steps of calculating a CIR by subtracting an interference signal level from a desired signal level of a transmission signal, wherein the desired signal level is obtained based on an average power of inverse-modulated data each obtained by inverse-modulating known data among received data with a theoretical value and by inverse-modulating unknown data with a decision value judged after demodulation, and wherein said interference signal level is obtained based on a distribution of inverse-modulated data each obtained by inverse-modulating known data among the received data with a theoretical value and by inverse-modulating unknown data with a decision value judged after demodulation, transmitting an indication for transmission power control according to the CIR of the transmission signal from the remote call station, and varying transmission power according to the indication for transmission power control from the transmission station.

According to still further aspect of the present invention the method includes the steps of calculating a CIR by subtracting an interference signal level from a desired signal level of a transmission signal, wherein the desired signal level is obtained based on an average power of inverse-modulated pilot symbols each obtained by weighting a pilot symbol with a fading estimated value and then inverse-modulating the weighted pilot symbol with a theoretical value, and wherein the interference signal level is obtained by weighting pilot symbols with a fading estimated value, then square averaging the weighted pilot symbols, and then subtracting the squared result from the desired signal level, transmitting an indication for transmission power control according to the CIR of the transmission signal from the remote call station, and varying transmission power according to the indication for transmission power control from the transmission station.

In the transmission power control system with the above-mentioned configuration according to the present invention, received symbols are inverse-modulated using pilot symbols or known portions or known data in which the transmission data row is known. Since the inverse modulation does not erroneously affect known data, the influence of error does not extend to the whole portion. As a result, the CIR measurement and power control can be performed with improved precision.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, an embodiment of the present invention will be described below with reference to the attached drawings.

Figure 1:
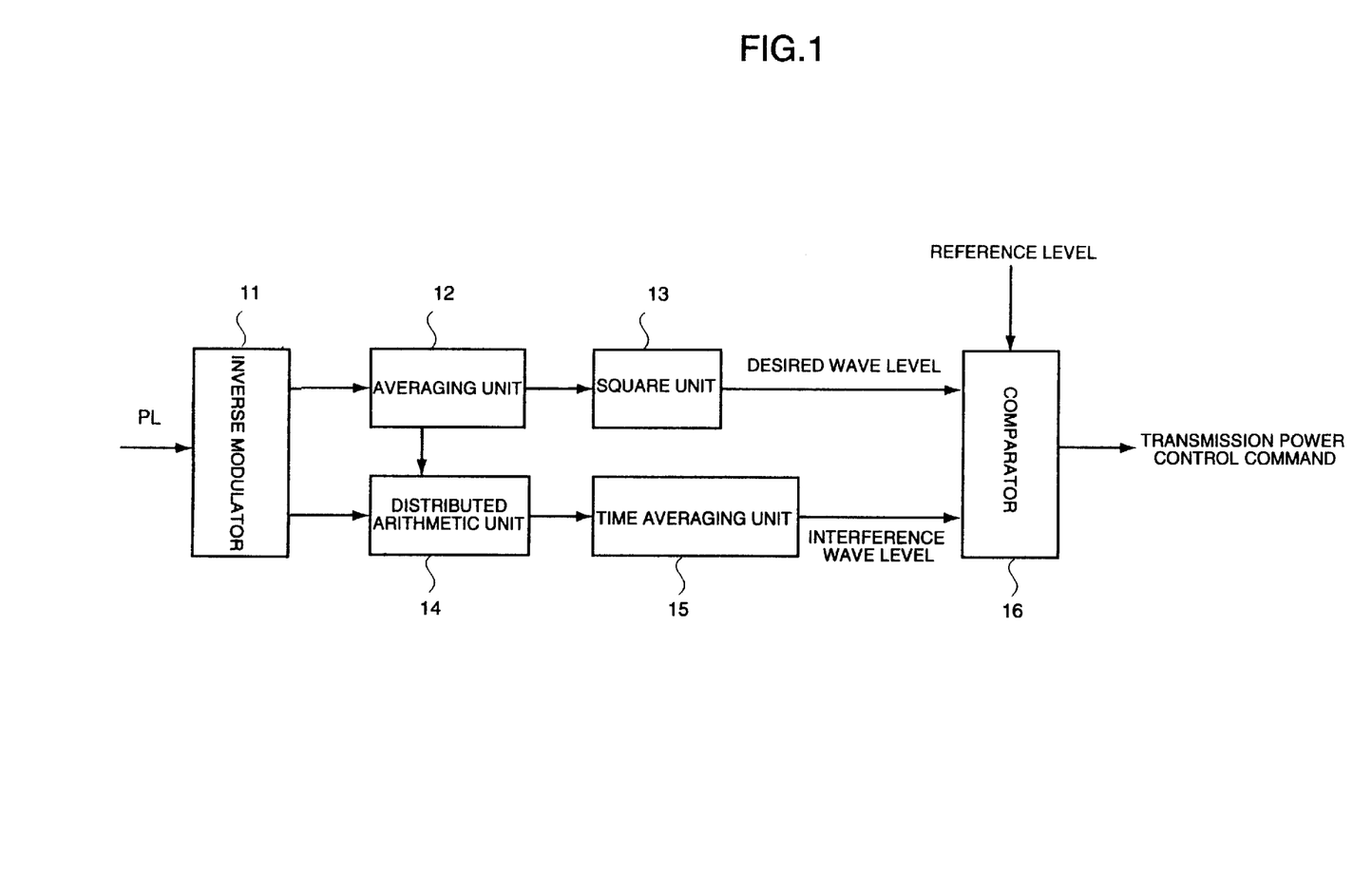
FIG. 1 is a block diagram showing the configuration of a transmission power control system according to a first embodiment of the present invention.

FIG. 1 is a block diagram showing the configuration of a transmission power control system according to an embodiment of the present invention. The present embodiment will be described below by referring to FIG. 1.

The transmission power control system of the present embodiment is disposed in a base station and mobile stations. The transmission power control system is formed of an inverse modulator 11, an averaging unit 12, a square unit 13, a distributed arithmetic unit 14, a time averaging unit 15, and a comparator 16. Elements shown in FIG. 1 configure CIR calculating means. The comparator 16 forms part of the CIR calculating means and acts as transmission power indicating means.

The inverse modulator 11 receives received pilot symbols and justifies the phases of the pilot symbols to the same value by inversely rotating them with respective theoretical values thereof, then outputting the result to the averaging unit 12 and the distributed arithmetic unit 14.

The averaging unit 12 obtains an averaged vector by dividing the composition of vectors by a composite symbol number, and then outputs it to the square unit 13 and the distributed arithmetic unit 14.

The square unit 13 obtains a desired wave signal level by squaring the averaged vector, and then outputs it to the comparator 16.

The distributed arithmetic unit 14 obtains a distributed value of pilot symbols inversely-modulated in the inverse modulator 11 and outputs it to the time averaging unit 15.

The distributed arithmetic unit 14 obtains the distribution value for each of plural slots. Then, the time averaging unit 15 obtains an interference signal level by averaging the resultant distributed values, and then outputs it to the comparator 16.

The comparator 16 receives the desired wave signal level from the square unit 13, an interference wave signal level from the time averaging unit 15, and a predetermined reference value. The comparator 16 compares the CIR (carrier power to intererece power ratio), or the difference between the desired wave signal level and the interference signal level, with the reference value, and then outputs a transmission power control command according to the comparison result.

When the CIR is more than the reference value, the base station (or mobile station) transmits a transmission power reducing command to the mobile station (or base station). When the mobile station (or base station) receives the command, it immediately reduces its transmission power by a predetermined control step width. When the CIR is less than the reference value, the base station (or mobile station) transmits a transmission power increasing command to the mobile station (or base station). When the mobile station (or base station) receives the command, it immediately increases its transmission power by a predetermined control step width.

Figure 2:
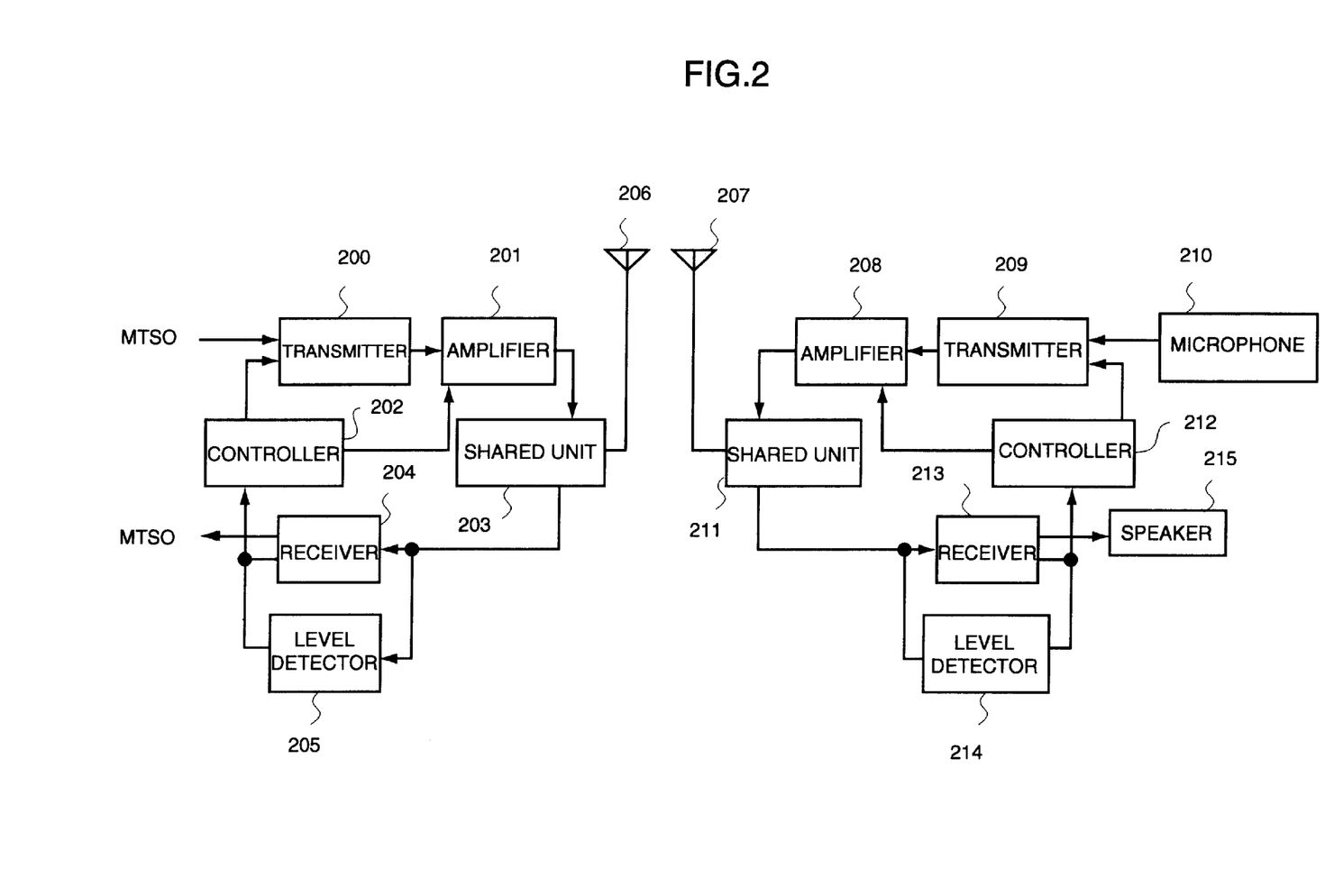
FIG. 2 is a block diagram showing the configuration of a base station and the configuration of a mobile station, each embodying the transmission power control system according to the present invention.

FIG. 2 is a diagram showing the combined configuration of a base station and a mobile station each embodying the transmission power control system according to the present invention.

The flow of voice signals at a calling time will be described below. The transmitter 200 at a base station modulates a voice signal from a mobile telephone switching office (MTSO) with a radio signal. Then the amplifier 201 amplifies the modulated signal. The amplified signal is radiated from the antenna 206 via the sharing unit 203. The transmission signal from the antenna 206 is received with the antenna 207 in a mobile station. The receiver 213 receives the transmission signal via the sharing unit 211 and then demodulates it. The speaker 215 outputs the demodulated signal as a voice signal.

On the other hand, the transmitter 209 receives an audio signal from a microphone 210 at a mobile station, and then modulates it with a radio frequency signal. Thereafter, the amplifier 208 amplifies the modulated signal. The antenna 207 transmits the amplified signal. The antenna 206 receives the transmission signal radiated from the antenna 207. The receiver 204 demodulates the transmission signal and then inputs the demodulated signal into the mobile telephone switching office (MTSO).

The level detector 205 at a base station measures a CIR while the level detector 214 at a mobile station measures a CIR. The controller (transmission power adjusting means) 202 at the base station transmits a transmission power control command via the transmitter in response to a CIR, increases or decrease the transmission power of the amplifier by a predetermined control step width D in response to the transmission power control command, and detects a current power transmission power. The controller (transmission power adjusting means) 212 at the mobile station transmits a transmission power control command via the transmitter in response to a CIR, increases or decrease the transmission power of the amplifier by a predetermined control step width D in response to the transmission power control command, and detects a current power transmission power.

In the embodiment shown in FIG. 1, the transmission power control is periodically performed at a base station and a mobile station during a calling state.

In this case, the base station acts as a transmission station or remote call station, or a mobile station acts as a remote call station or transmission station.

Embodiment 1

FIG. 5 is a diagram showing the configuration of a frame format used for communications in the present embodiment. In the present embodiment, a slot is formed of a pilot symbol, a TPC bit, and frame control data or voice data. A slot is formed of n slots.

The pilot symbol is formed of four symbols PL1, PL2, PL3, and PL4. The TPC bit is formed of one bit.

As illustrated in FIG. 1, the inverse demodulator 11 receives pilot symbols of digital sampling signals at a symbol rate primarily-demodulated by the CDMA receiver and then inversely rotates respectively pilot signals PL1, PL2, PL3, and PL4 with theoretical values of them, thus justifying the phases of the inverted signals. In concrete, the inverse demodulator 11 multiplies a received pilot symbol by the complex conjugate of a theoretical value of a pilot signal.

The averaging unit 12 executes a vector composition to add four pilot signals inverse-modulated and then averages the resultant vector by dividing it by the number 4 of the composite symbols. The square unit 13 squares the averaged vector to obtain a desired wave signal level.

The distributed arithmetic unit 14 obtains a distributed value of the pilot symbols inverse-modulated by the inverse modulator 11. In concrete, the difference between the average value obtained by the averaging unit 12 and the pilot symbol inverse-modulated by the inverse modulator 11 is squared. The squared values for four pilot symbols are added. The added value is divided by the number 4 of pilot symbols.

The time averaging unit 15 obtains an interference signal level by integrating the distributed value for past plural slots and then averaging the result.

The comparator 16 compares a CIR, or the difference between an interference signal level and a desired signal level, with a reference value. When the CIR is more than the reference value according to the comparison result, the base station (or mobile station) transmits a transmission-power reducing command to a mobile station (or base station). This command is issued when the TPC bit is 0 (see FIG. 5). When receiving the command, the mobile station (or base station) immediately decreases its transmission power by a predetermined control step width D.

When the CIR is less than the reference value, the base station (or mobile station) transmits a command to the mobile station (or base station) to increase its transmission power. This command is issued when the TPC bit is 1. When receiving the command, the mobile station (or base station) immediately increases its transmission power by a predetermined control step width D.

Under the transmission power control described above, the variation of the transmission power is suppressed within the control step width D.

Embodiment 2

Figure 3:
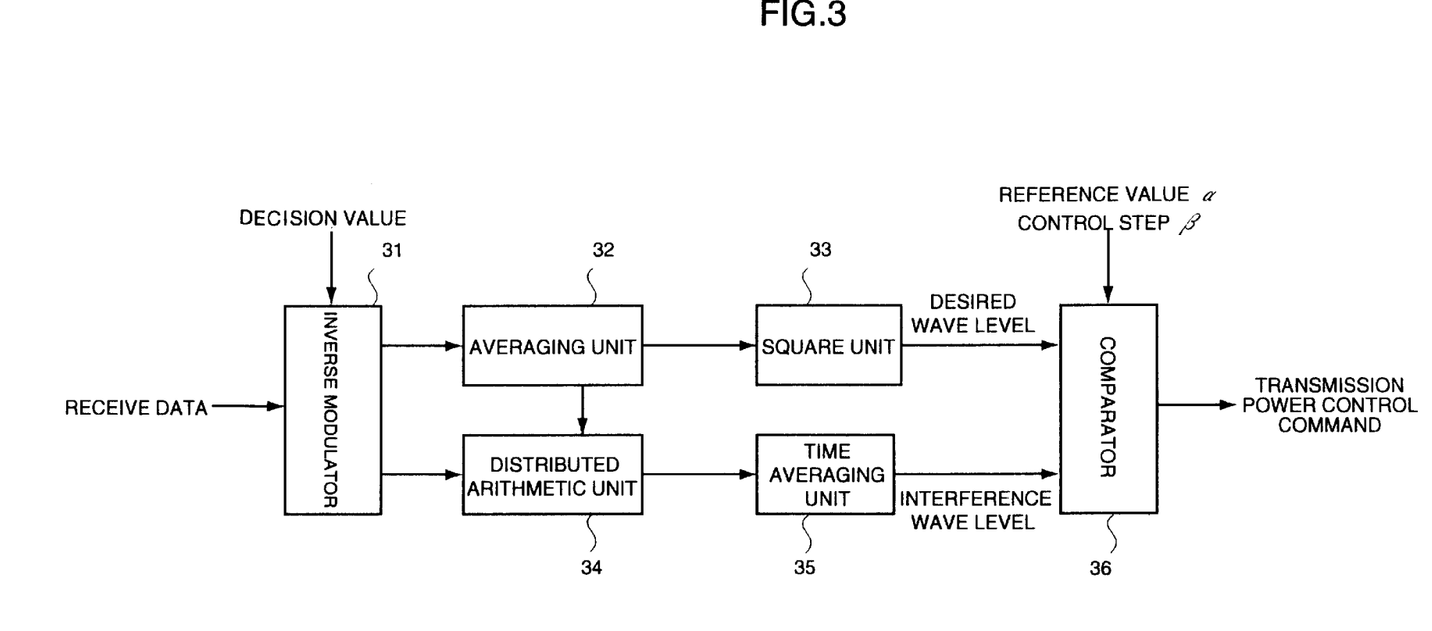
FIG. 3 is a block diagram showing the configuration of a transmission power control system according to a second embodiment of the present invention.

FIG. 3 is an explanatory diagram showing the configuration of the transmission power control system according to the present invention.

The system configuration of the present embodiment resembles that in the embodiment 1. In FIG. 3, the control is periodically performed at the base station and a mobile station during a calling state. A base station is used as a transmission station or a remote call station while a is mobile station is used as a remote call station or a transmission station.

As with the first embodiment, the frame format in the present embodiment is shown in FIG. 5. A slot is formed of a pilot symbol, a TPC bit, and frame control data or audio data. One frame is formed n slots. The pilot symbol is formed of symbols PL1, PL2, PL3, ..., PLn. The TPC bit is formed of two bits.

The inverse modulator 31 inverse-rotates pilot signals PL1, PL2, PL3, ... with theoretical values thereof in response to a received signal, thus justifying the phases thereof. The inverse modulator 31 also inverse-rotates the data signals DT1, DT2, DT3, ... with a decision value signal, thus justifying the phases thereof. In concrete, a received pilot symbol is multiplied by a complex conjugate of a theoretical value of a pilot signal. The received data symbol is multiplied by a complex conjugate of a decision value of which the polarity has been judged after demodulation. The vector composition is carried out by adding the receive signals inverse-modulated by the averaging unit 32. Then the resultant vector is averaged by dividing by the composite symbol number. The square unit 33 squares the averaged vector to obtain a desired wave signal level.

On the other hand, the distributed arithmetic unit 34 obtains the distributed value of a received signal which is inverse-modulated by the inverse modulator 31. In concrete, the distributed arithmetic unit 34 squares the difference between the average value obtained by the averaging unit 32 and the received signal inverse-modulated by the inverse modulator 31. The squared values are added corresponding to the number of received signals. Then, the resultant sum is divided by the number of received signals. Using a forgetting factor, the time averaging unit 35 averages the distributed values for plural slots to obtain the average value as an interference wave signal level.

The comparator 36 compares the CIR value, or the difference between an interference wave signal level and a desired wave signal level, with the reference value CIR value $\alpha$. As a result, if the CIR is more than ($\alpha+\beta$), the base station (or a mobile station) transmits a command to a mobile station (or the base station) to decrease its transmission power. The command is issued when the TPC bit is 00. The mobile station (or base station) immediately decreases its transmission power by twice a predetermined control step width, or $2\beta$, in response to the command.

If the CIR is less than ($\alpha+\beta$) and more than $\alpha$, the base station (or a mobile station) transmits a command to a mobile station (or the base station) to decrease its transmission power. The command is issued when the TPC bit is 01. The mobile station (or base station) immediately decreases its transmission power by a predetermined control step width $\beta$, in response to the command.

If the CIR is less than $\alpha$ and more than ($\alpha-\beta$), the base station (or a mobile station) transmits a command to a mobile station (or the base station) to increase its transmission power. The command is issued when the TPC bit is 10. The mobile station (or base station) immediately increases its transmission power by a predetermined control step width $\beta$, in response to the command.

If the CIR is less than ($\alpha-\beta$), the base station (or a mobile station) transmits a command to a mobile station (or the base station) to increase its transmission power. The command is issued when the TPC bit is 11. The mobile station (or base station) immediately increases its transmission power by twice a predetermined control step width, or $2\beta$, in response to the command, where $\beta$ is a positive number.

Under the above-mentioned control, variations in transmission power can be suppressed within a range.

Embodiment 3

Figure 4:
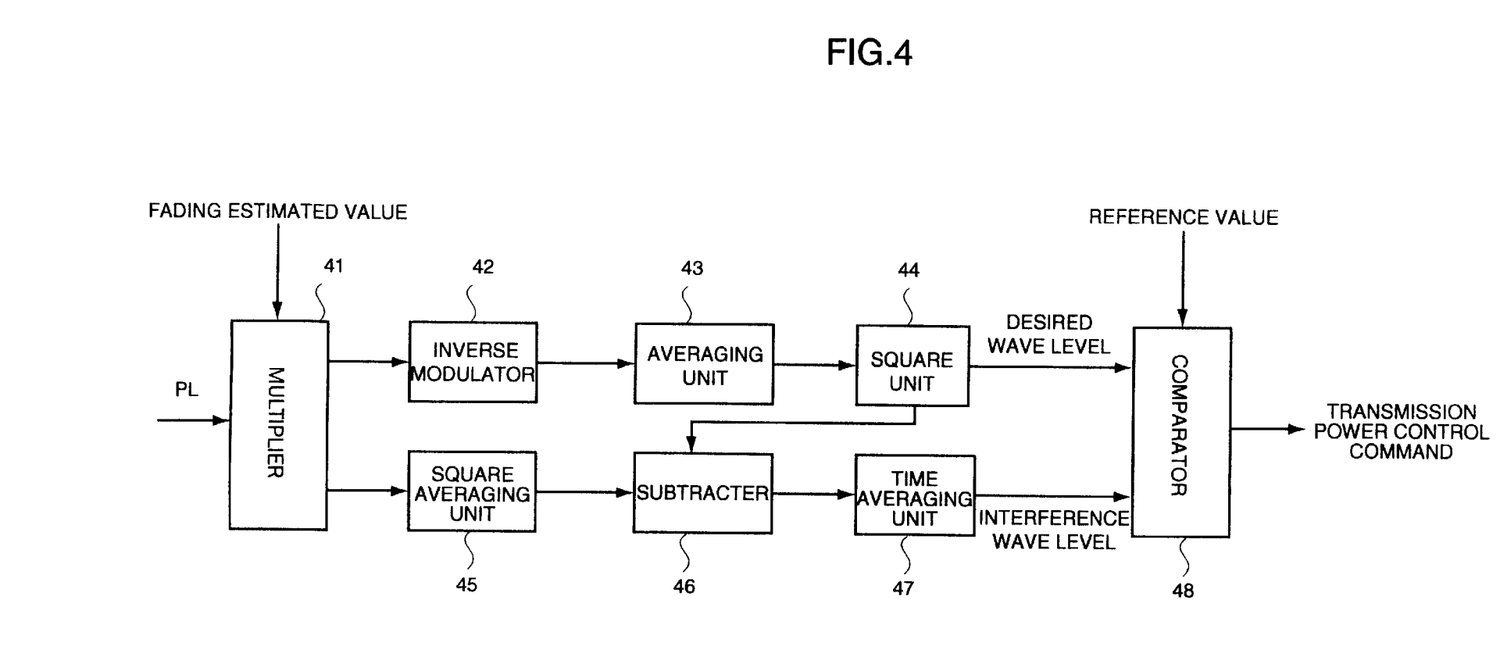
FIG. 4 is a block diagram showing the configuration of a transmission power control system according to a third embodiment of the present invention.

FIG. 4 is an explanatory diagram showing the configuration of the transmission power control system according to the third embodiment of the present invention.

The system configuration according to the present embodiment is the same as that in the embodiment 1. In the present embodiment, the power control is periodically performed in the base station and mobile stations during a calling state.

Likewise the embodiments shown in FIGS. 1 and 2, the frame format is shown in FIG. 5. A slot is formed of a pilot symbol, a TPC bit, and frame control data or voice data. One frame is formed n slots. The pilot symbol is formed of four symbols PL1, PL2, PL3, and PL4. The TPC bit is form of one bit.

The multiplier 41 multiplies a pilot symbol by an estimated fading vector. In the fading vector estimation, the phases are justified by multiplying a pilot signal by a complex conjugate of a theoretical value of the pilot signal. Then, the composition of vectors in the same phase is performed. The resultant vector is averaged with the composite symbol number. A current fading can be estimated by performing a high-order interpolation using past fading vectors.

The inverse modulator 42 respectively multiplies pilot signals PL1, PL2, PL3, and PL4 by a fading vector in response to a received signal and then inversely rotates the resultant products with a theoretical value of a pilot signal, so that the phases are justified. In concrete, the pilot signals is multiplied by the complex conjugate of a theoretical value of a pilot signal. Then, the averaging unit 43 averages the resultant four products by adding them and then dividing the resultant sum by 4. The square 44 squares the resultant average value to obtain a desired signal level.

In order to calculate the interference signal level, the square averaging unit 45 multiplies pilot signals PL1, PL2, PL3, and PL4 by a fading vector, respectively, and squares each of the resultant products, and then averages the squared values. The subtracter 46 subtracts the desired signal level from the average value. The time averaging unit 47 averages values for plural slots to obtain an interference wave signal level.

According to the level calculating method using a fading estimated value according to the present embodiment, the noise error due to fading can be removed. Hence, this method is particularly effective when the RAKE composition or diversity composition is performed in the CDMA (Code Division Multiple Access).

The comparator 48 subtracts the interference wave signal level from the desire wave signal level and then compares the resultant CIR with the reference CIR value. As a result, if the CIR is more than the reference value, the base station (or a mobile station) transmits a command to a mobile station (or the base station) to decrease its transmission power. The command is issued when the TPC bit is 0. The mobile station (or base station) immediately increases its transmission power by a predetermined control step width D in response to the command.

If the CIR is less than the reference value, the base station (or a mobile station) transmits a command to a mobile station (or the base station) to increase its transmission power. The command is issued when the TPC bit is 1. The mobile station (or base station) immediately increases its transmission power by a predetermined control step width D in response to the command.

Under the above-mentioned control, variations in transmission power can be suppressed within a range.

According to the present invention, the above-mentioned configuration can avoid that an error in transmission power control causes the transmission power to increase undesirably, thus suppressing the power consumption at the base station and mobile stations as well as interference waves. As a result, there is the advantage of increasing the traffic amount in the mobile communications system.

What is claimed is:

1. A transmission power control system suitable in use for a mobile communications system, in which communications between a base station and a mobile station are performed through a many-valued encoding operation in which codes are represented with symbols, said base station acting as a transmission station or a remote call station, said mobile station acting as a remote call station or a transmission station, said base station having a transmitter and a receiver and said mobile station having a transmitter and a receiver, comprising:

CIR calculating means disposed in said transmission station, for calculating a CIR by subtracting an interference signal level from a desired signal level of a transmission signal, wherein said desired signal level is obtained based on an average power of inverse-modulated pilot symbols each obtained by inverse-modulating a pilot symbol with a theoretical value of said pilot symbol, and wherein said interference signal level is obtained based on a distribution of inverse-modulated pilot symbols each obtained by inverse-modulating a pilot symbol with a theoretical value of said pilot symbol, transmission power indicating means disposed in said transmission station, for transmitting an indication for transmission power control according to the CIR of said transmission signal from said remote call station, and transmission power adjusting means disposed in said remote call station, for varying transmission power according to the indication for transmission power control from said transmission station.

2. A transmission power control system suitable in use for a mobile communications system, in which communications between a base station and a mobile station are performed through a many-valued encoding operation in which codes are represented with symbols, said base station acting as a transmission station or a remote call station, said mobile station acting as a remote call station or a transmission station, said base station having a transmitter and a receiver and said mobile station having a transmitter and a receiver, comprising:

CIR calculating means disposed in said transmission station, for calculating a CIR by subtracting an interference signal level from a desired signal level of a transmission signal, wherein said desired signal level is obtained based on an average power of inverse-modulated data each obtained by inverse-modulating known data among received data with a theoretical value and by inverse-modulating unknown data with a decision value judged after demodulation, and wherein said interference signal level is obtained based on a distribution of inverse-modulated data each obtained by inverse-modulating known data among said received data with a theoretical value and by inverse-modulating unknown data with a decision value judged after demodulation, transmission power indicating means disposed in said transmission station, for transmitting an indication for transmission power control according to the CIR of said transmission signal from said remote call station, and transmission power adjusting means disposed in said remote call station, for varying transmission power according to the indication for transmission power control from said transmission station.

3. A transmission power control system suitable in use for a mobile communications system, in which communications between a base station and a mobile station are performed through a many-valued encoding operation in which codes are represented with symbols, said base station acting as a transmission station or a remote call station, said mobile station acting as a remote call station or a transmission station, said base station having a transmitter and a receiver and said mobile station having a transmitter and a receiver, comprising:

CIR calculating means disposed in said transmission station, for calculating a CIR by subtracting an interference signal level from a desired signal level of a transmission signal, wherein said desired signal level is obtained based on an average power of inverse-modulated pilot symbols each obtained by weighting a pilot symbol with a fading estimated value and then inverse-modulating the weighted pilot symbol with a theoretical value, and wherein said interference signal level is obtained by weighting pilot symbols with a fading estimated value, then square averaging the weighted pilot symbols, and then subtracting the squared result from said desired signal level,     transmission power indicating means disposed in said transmission station, for transmitting an indication for transmission power control according to the CIR of said transmission signal from said remote call station, and     transmission power adjusting means disposed in said remote call station, for varying transmission power according to the indication for transmission power control from said transmission station.

4. A method for controlling transmission power of a mobile communications system, in which communications between a base station and a mobile station are performed through a many-valued encoding operation in which codes are represented with symbols, said base station acting as a transmission station or a remote call station, said mobile station acting as a remote call station or a transmission station, said base station having a transmitter and a receiver and said mobile station having a transmitter and a receiver, comprising the steps of:

calculating a CIR by subtracting an interference signal level from a desired signal level of a transmission signal, wherein said desired signal level is obtained based on an average power of inverse-modulated pilot symbols each obtained by inverse-modulating a pilot symbol with a theoretical value of said pilot symbol, and wherein said interference signal level is obtained based on a distribution of inverse-modulated pilot symbols each obtained by inverse-modulating a pilot symbol with a theoretical value of said pilot symbol,     transmitting an indication for transmission power control according to the CIR of said transmission signal from said remote call station, and     varying transmission power according to the indication for transmission power control from said transmission station.

5. A method for controlling transmission power of a mobile communications system, in which communications between a base station and a mobile station are performed through a many-valued encoding operation in which codes are represented with symbols, said base station acting as a transmission station or a remote call station, said mobile station acting as a remote call station or a transmission station, said base station having a transmitter and a receiver and said mobile station having a transmitter and a receiver, comprising the steps of:

calculating a CIR by subtracting an interference signal level from a desired signal level of a transmission signal, wherein said desired signal level is obtained based on an average power of inverse-modulated data each obtained by inverse-modulating known data among received data with a theoretical value and by inverse-modulating unknown data with a decision value judged after demodulation, and wherein said interference signal level is obtained based on a distribution of inverse-modulated data each obtained by inverse-modulating known data among said received data with a theoretical value and by inverse-modulating unknown data with a decision value judged after demodulation,     transmitting an indication for transmission power control according to the CIR of said transmission signal from said remote call station, and     varying transmission power according to the indication for transmission power control from said transmission station.

6. A method for controlling transmission power of a mobile communications system, in which communications between a base station and a mobile station are performed through a many-valued encoding operation in which codes are represented with symbols, said base station acting as a transmission station or a remote call station, said mobile station acting as a remote call station or a transmission station, said base station having a transmitter and a receiver and said mobile station having a transmitter and a receiver, comprising the steps of:

calculating a CIR by subtracting an interference signal level from a desired signal level of a transmission signal, wherein said desired signal level is obtained based on an average power of inverse-modulated pilot symbols each obtained by weighting a pilot symbol with a fading estimated value and then inverse-modulating the weighted pilot symbol with a theoretical value, and wherein said interference signal level is obtained by weighting pilot symbols with a fading estimated value, then square averaging the weighted pilot symbols, and then subtracting the squared result from said desired signal level,     transmitting an indication for transmission power control according to the CIR of said transmission signal from said remote call station, and     varying transmission power according to the indication for transmission power control from said transmission station.

\* \* \* \* \*